A. T. WILLIAMS.

COMPENSATION PENDULUM.

No. 10,425. Reissued Dec. 11, 1883.

Witnesses.

Lawrence R. Moller.

John R. Snow.

Inventor.

Allen T. Williams, by J. E. Maynadier his atty.

N. PETERS, Photo-Lithographer, Washington, D. C.

UNITED STATES PATENT OFFICE.

ALLEN T. WILLIAMS, OF TAUNTON, MASSACHUSETTS.

COMPENSATION-PENDULUM.

SPECIFICATION forming part of Reissued Letters Patent No. 10,425, dated December 11, 1883.

Original No. 248,541, dated October 18, 1881. Application for reissue filed October 22, 1883.

*To all whom it may concern:*

Be it known that I, ALLEN T. WILLIAMS, of Taunton, of the county of Bristol and State of Massachusetts, have invented a new and useful Improvement in Compensation-Pendulums for Clocks; and I do hereby declare the same to be described in the following specification and represented in the accompanying drawings, of which—

Figure 3:
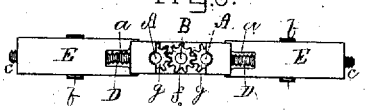
Figure 1:
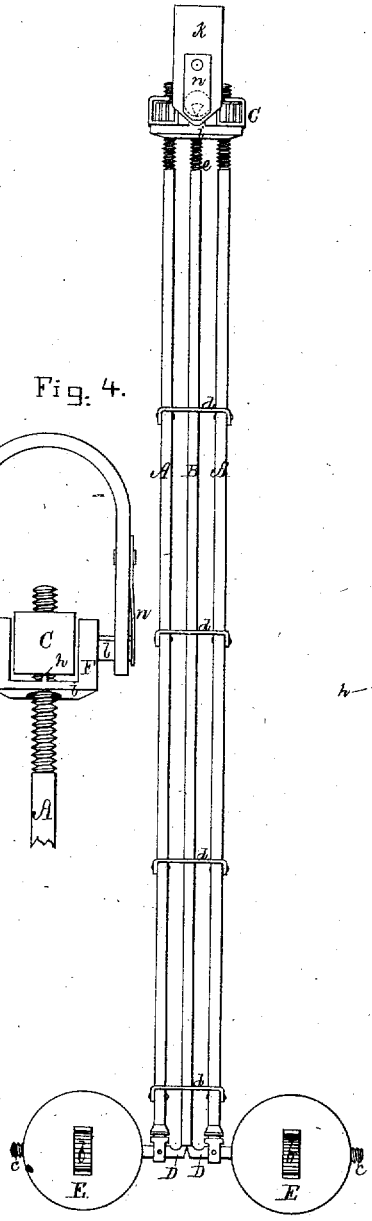
Figure 2:
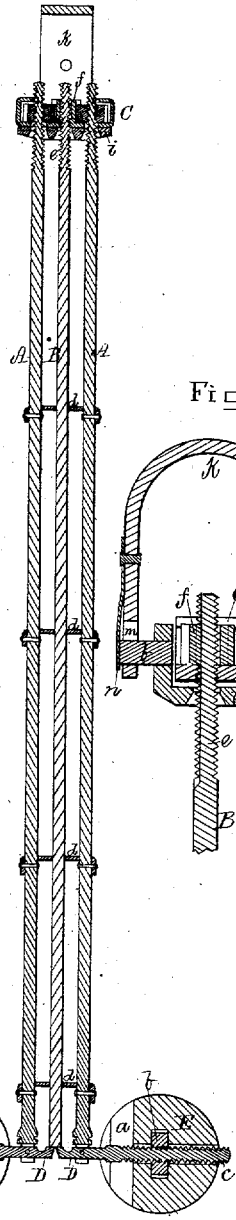
Figure 4:
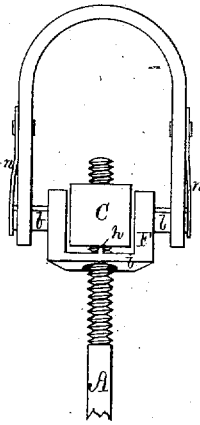
Figure 6:
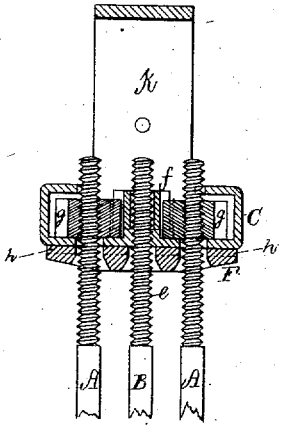
Figure 5:
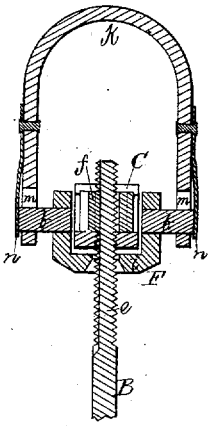
Figure 7:
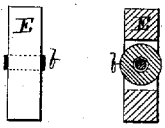
Figure 8:
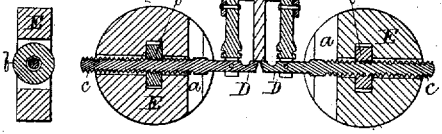

Figure 1 is a front elevation, and Fig. 2 a longitudinal section, of a pendulum of my improved kind. Fig. 3 is a top view without its so-called "stirrup-bow." Fig. 4 is an end view, Fig. 5 a transverse section, and Fig. 6 a longitudinal section, of the stirrup and parts at the upper portion of the pendulum, the last three figures being made on an enlarged scale. Fig. 7 is a top view of one of the weights, and Fig. 8 a transverse section of it and its adjusting-nut.

The nature of my invention is duly set forth in the claims hereinafter presented.

In constructing this compensation-pendulum I employ three metallic rods, A B A, arranged parallel to each other and at suitable distances apart, the middle rod being of brass and the two outer ones of iron or steel. In other words, the middle rod is to be of a metal or material which, under any increase of temperature, will expand somewhat more than either of the other rods, which are to be supposed to be of one kind of metal or material. These rods extend down from a cross-head, C, the middle rod, B, at its foot being stepped upon the inner or shorter arms of two levers, D D, jointed or fulcrumed to the outer rods, A A, at their lower ends, as shown. The longer arms of such levers extend diametrically through two cylindrical or other proper-shaped weights, E E, each of which is formed with a segmental recess, *a*, arranged in it as shown, such recess being to enable the weight to be moved inward nearly to the middle rod. Each weight is to be adapted to its lever-arm, so as to be capable of being moved thereon lengthwise of it. A screw-nut, *b*, arranged to screw upon the lever-arm and to extend transversely through the weight, serves, with a screw, *c*, formed on such arm, to effect the adjustment of the weight either nearer to or farther from the next adjacent rod A, as circumstances may require. The outer or steel rods, A A, are or may be connected by a series of cross pieces or bars, *d*, fastened to them, and arranged as represented. The middle or brass rod, B, extends loosely through the cross-pieces *d*, and has upon its upper end a screw, *e*, to screw into and through the cross-head C. Within the said cross-head, and concentrically on the rod B, is a small spur-gear, *f*, which is adapted to the rod by a "feather-connection," and engaged with two other like gears, *g g*, arranged within the cross-head in manner as shown, such gears *g g* being screwed upon the outer rods, A A, upon which the cross-head fits loosely. The cross-head laps on the top of each of the gears *g*. By revolving the middle rod, B, either way transversely of it, the gears will be revolved simultaneously. Thus, by means of the gears and screw, the distance of the cross-head from the weights may be either increased or diminished, the three rods in the meantime not varying their relative positions.

The cross-head C rests in a stirrup, F, and upon knife-edge bearings *h*, extending up from the foot *i* of such stirrup, such bearings being at the middle of the said foot and arranged in it lengthwise of it, in order for the cross-head to be able to vibrate transversely of it upon such knife-edge bearings. The bow *k* of the stirrup is separate from the foot *i*, from the opposite sides of which knife-edge bearings *l l* project into holes *m* in the legs of the bow. Springs *n*, covering such holes, are fixed to the outer sides of the said legs. These springs serve, under ordinary circumstances, to maintain the bow in connection with the knife-edge bearings *l l* and to readily admit of its removal from or application to them when occasion may require.

From the above it will be seen that the pendulum is suspended by means which will admit of its oscillating in directions at right angles to each other, such being productive of advantage. On a rise of temperature of the atmosphere taking place, the middle rod of the pendulum will be expanded more than will the two other rods, in consequence of which the levers D will be moved on their fulcra, so as to force the outer arms of such levers and their weights upward in a manner to maintain the common center of gravity of the weights at the desirable distance from the lower edges of the knife-edge bearings *l l*, in order for the periods of vibrations of the pendulum to be kept uniform. So, on a diminution of the temperature taking place, the middle rod will contract lengthwise more than the outer rods, in which case the weights will fall, so as to maintain their common center of gravity at its proper distance from the bearings *l l*. This will be clearer if the effect of expansion or contraction of the rods A A be first considered, and then the compensation produced by the expansion or contraction of the rod B. Take the case of a rise in temperature. The expansion of the rods A A will lower the fulcra of the levers D D, and consequently lower the weights E E, and this would make the pendulum somewhat longer and its rate slower; but the elongation of rod B will move each lever D on its fulcrum by depressing the inner end of each lever, and will thereby raise each weight E E, and, as the rods A A and B expand simultaneously, the total effect will be to keep the effective length of the pendulum always the same, provided the inner and outer arms of the levers D be accurately proportioned, for as the expansion of rods A A, if not compensated, would lower the weights E E, (by lowering the fulcra of the levers D D,) so the expansion of rod B, if not compensated, would raise these weights, (by tilting the levers D D,) and, conversely, the contractions of rods A would raise the weights E E, while the contraction of rod B would lower them. To make these two motions of the weights mutually compensating, and thereby make a pendulum whose rate is practically unaffected by changes of temperature, it is of course necessary to adjust the leverage of the levers D D very accurately. The means for doing this are the nuts *b* and screws *c*, the relative effective length of the outer arm of each lever D depending obviously upon the position of its nut *b* on its screw *c*. The mode of getting the necessary nice adjustment of these nuts *b* on their screws *c* will be understood by all skilled in the art. It will also be clear that the gears *f g g* are to be used to get the nice adjustment requisite to give the desired rate, under the assumption that the temperature is constant, the levers D D and their nuts *b* and screws *c* acting (when accurately adjusted) to keep the rate the same under varying temperatures.

I would remark that what is termed the "bow" of the stirrup may be formed or constructed differently from what is represented, as it may consist simply of two arms to project down from a proper means of support.

Should it be desirable to change the position of the levers D D, the cross-head is cut out or open to admit of the gear *f* being moved out of engagement with the gears *g g*, thereby enabling the middle rod to be revolved without moving the outer rods.

What I claim as my invention in the described pendulum is as follows:

1. The combination of the rods A B A, as described, having screws at their upper parts, and provided with the levers and weights, as set forth, with the cross-head and the gears, adapted to such rods in manner substantially as described.

2. The combination of the stirrup F, having its bow and foot connected by knife-edge bearings *l l* with the cross-head C, the rods A B A, and the two levers D, adapted to such rods, and provided with weights, all being substantially as set forth.

3. The combination of the stirrup F, provided at its foot with the two sets of knife-edge bearings *h* and *l*, arranged as set forth, with the cross-head C, the rods A B A, and the two levers D, adapted to such rods, and provided with weights, all being substantially as specified.

4. The combination of the adjusting-nuts *b* and screws *c* with the weights E, levers D, rods A B A, and their connecting cross-head C, all being adapted, arranged, and to operate substantially as set forth.

5. Each of the weights E, recessed as described, in combination with the lever D, the three rods A B A, and their cross-heads C, arranged as set forth.

ALLEN T. WILLIAMS.

Witnesses:
J. E. MAYNADIER,
J. R. SNOW.